(12) United States Patent
Ohno et al.

(10) Patent No.: US 8,420,204 B2
(45) Date of Patent: Apr. 16, 2013

(54) BUILDING BOARD

(75) Inventors: Syouzou Ohno, Nagoya (JP); Yoshinori Hibino, Ama-gun (JP)

(73) Assignee: Nichiha Corporation, Nagoya-Shi (JP)

( * ) Notice: Subject to any disclaimer, the term of this patent is extended or adjusted under 35 U.S.C. 154(b) by 385 days.

(21) Appl. No.: 12/912,376

(22) Filed: Oct. 26, 2010

(65) Prior Publication Data
US 2011/0097547 A1   Apr. 28, 2011

(30) Foreign Application Priority Data
Oct. 27, 2009 (JP) ................. 2009-246513

(51) Int. Cl.
*B32B 3/00* (2006.01)
(52) U.S. Cl.
USPC ............ 428/161; 428/156; 428/920; 428/921
(58) Field of Classification Search .................. 428/156, 428/161, 532, 537.1, 920, 921
See application file for complete search history.

(56) References Cited

FOREIGN PATENT DOCUMENTS
JP   61-178484 A   8/1986

*Primary Examiner* — Catherine A Simone
(74) *Attorney, Agent, or Firm* — Birch, Stewart, Kolasch & Birch, LLP

(57) ABSTRACT

Provided is a building board having non-flammability and being excellent in designability. In the building board, an impregnated coating film, an aqueous coating film, a solvent-based clear coating film and a top clear coating film are formed, in this order, on a surface of a base member. The aqueous coating film is formed of a synthetic resin and a fireproofing agent; the top clear coating film is formed of a UV-curable type resin and a fireproofing agent; the amount of fireproofing agent in the aqueous coating film is 10 to 50 wt % with respect to the solids of the aqueous coating film; the amount of the fireproofing agent in the top clear coating film is 5 to 20 wt % with respect to the solids of top clear coating film; and the total calorific value measured in accordance with ISO 5660, for 20 minutes using a cone calorimeter, is smaller than 8 MJ/m$^2$.

3 Claims, No Drawings

BUILDING BOARD

BACKGROUND OF THE INVENTION

1. Field of the Invention

The present invention relates to a building board that has non-flammability and is excellent in designability.

2. Description of the Related Art

Conventional building boards used for forming wall faces of houses include, for instance, ceramic-based siding boards such as wood fiber-reinforced cement boards, fiber-reinforced cement boards, wood cement boards, fiber-reinforced cement-calcium silicate boards, slag gypsum boards and the like, as well as metallic siding boards, ALC boards and the like.

Design is a major concern in such building boards, and thus improvements in designability are ever in demand.

The surface of a base member of such building boards is coated with, for instance, a UV-curable resin or an electron-beam curable resin that is then cured to form a tough topcoat layer on the surface of the board.

For instance, Japanese Patent Application Laid-open No. S61-178484 discloses an inorganic ceramic-based dressing board that comprises an inorganic ceramic-based base member that has been subjected to a filling treatment; on at least one face of the base member, one or various types of coating layer of a resin coating material such as a acrylic urethane resin, an acrylic resin, an epoxy resin or the like; and on the surface thereof, also a UV-curable type ultra-high hardness clear coating film layer 10μ to 300μ thick. The building board of Japanese Patent Laid-open No. S61-178484 has a topcoat layer formed using a UV-curable resin on the surface of a base member, and boasts a mirror surface finish having depth, as well as excellent designability.

However, resistance to fire is also a major concern, and improvements on fireproofing performance are likewise called for. When forming a topcoat layer on the surface a base member using a UV-curable resin, as in Japanese Patent Application Laid-open No. S61-178484, a significant amount of organic solids is present on the surface of the board, and it is difficult to secure non-flammability. This is true also when using electron-beam curable resins.

Some non-flammability can be imparted by reducing the top clear layer on the surface, but doing so prevents the top clear layer from providing a mirror surface finish having depth, and results in poorer designability.

SUMMARY OF THE INVENTION

In the light of the above conventional problems, it is an object of the present invention to provide a building board having non-flammability and being excellent in designability.

The present invention is a building board in which an impregnated coating film, an aqueous coating film, a solvent-based clear coating film and a top clear coating film are formed, in this order, on a surface of a base member. The aqueous coating film is formed of a synthetic resin and a fireproofing agent; the top clear coating film is formed of a UV-curable type resin and a fireproofing agent; the amount of the fireproofing agent in the aqueous coating film is 10 to 50 wt % with respect to the solids of the aqueous coating film; the amount of the fireproofing agent in the top clear coating film is 5 to 20 wt % with respect to the solids of the top clear coating film; and the total calorific value measured in accordance with ISO 5660, for 20 minutes using a cone calorimeter, is smaller than 8 $MJ/m^2$.

Examples of the base member include, for instance, ceramic-based siding boards such as wood fiber-reinforced cement boards, fiber-reinforced cement boards, wood cement boards, fiber-reinforced cement-calcium silicate boards, slag gypsum boards and the like, as well as metallic siding boards, ALC boards and the like.

Examples of the synthetic resin include, for instance, acrylic resins, silicone resins, fluororesins, acrylic silicone resins, polyurethane resins, epoxy resins and the like.

Examples of fireproofing agents include, for instance, organic compounds such as bromine compounds or phosphorus compounds, and inorganic compounds such as antimony compounds, aluminum hydroxide, magnesium hydroxide, swelling compounds and the like. Bromine compounds include, for instance, decabromodiphenyl ether, octabromodiphenyl ether, pentabromodiphenyl ether, hexabromocyclododecane, polystyrene bromide and the like. Examples of phosphorus compounds include, for instance, aromatic phosphoester such as triphenyl phosphate, tricresyl phosphate, cresyl phenyl phosphate; halogenated phosphoester such as trisdichloropropyl phosphate; as well as red phosphorus, ammonium phosphate, ammonium polyphosphate, sodium hexametaphosphate or the like. Examples of antimony compounds include, for instance, antimony trioxide, antimony tetroxide, antimony pentoxide, sodium antimonate or the like. Examples of swelling compounds include $SiO_2$, MGO, $Al_2O_3$ as a main component, for instance, minerals such as kaolins, smectites, vermiculites, micas and the like, for instance highly swelling montmorillonite among smectites, vermiculite, and swelling mica among micas. The dressing coating film and the top clear coating film may contain only one type of the foregoing fireproofing agents, or two or more types.

To form the impregnated coating film, the aqueous coating film and the solvent-based clear coating film, an impregnation sealer, an aqueous coating material and a solvent-based clear coating material, respectively, are applied using conventional coating equipment such as a flow coater, a sprayer, a roll coater or the like, followed by drying using conventional drying equipment such as a dryer or the like. The top clear coating film can be formed by applying a UV-curable type clear coating material using conventional coating equipment such as a flow coater, a sprayer, a roll coater or the like. However, the UV-curable type clear coating material does not cure unless irradiated by UV rays, and hence degradation of the work environment caused by uncured scattered mist in the spray booth becomes a concern. Therefore, the top clear coating film is preferably formed not through spraying, but through coating using a flow coater or a roll coater.

In the present invention, the top clear coating film and the aqueous coating film having a fireproofing agent are present in the surface. Specifically, two coating films have a fireproofing agent. Although it is possible to incorporate the fireproofing agent in the top clear coating film alone, an excess of fireproofing agent may give rise to cracking of the coating film during drying in a dryer, and the resulting coating film may be weak, brittle and exhibit significantly impaired mechanical properties. In the present invention, therefore, the aqueous coating film contains 10 to 50 wt % solids of fireproofing agent, and the top clear coating film contains 5 to 20 wt % solids of fireproofing agent, in such a manner that both the aqueous coating film and the top clear coating film have a fireproofing agent. The building board exhibits as a result excellent properties and excellent non-flammability.

In the present invention, the aqueous coating film is formed on the impregnated coating film, and hence the aqueous coating film exhibits good adhesion. The impregnation sealer that forms the impregnated coating film may be a solvent-based coating material or an aqueous coating material, but is preferably an aqueous coating material, since in that case organic solids can be reduced, and the building board exhibits good non-flammability.

In the present invention, the solvent-based clear coating film is formed on the aqueous coating film, and the top clear coating film is formed on the solvent-based clear coating film. That is because the solvent-based coating material has better leveling properties than the aqueous coating material, and can form a smoother coated surface. The state of the surface can resemble thus more closely that of a mirror surface, which makes for excellent designability. The solvent-based clear coating film is formed, by the solvent-based coating material, on the aqueous coating film that is formed by the aqueous coating material. The top clear coating film is further formed, by the UV-curable type clear coating material, on the solvent-based clear coating film. Each coating film exhibits as a result excellent adhesion.

In the present invention, the surface has preferably an uneven pattern. Preferably, the level difference between protrusions and recesses is no greater than 1.5 mm, and the angle formed between the inclined faces of the protrusions and the recesses is no greater than 60 degrees, since in that case there can be formed a uniform coating film having excellent designability and excellent non-flammability. Preferably, a colored clear coating material comprising a pigment is used as the solvent-based clear coating material, since in that case the colored clear coating material sinks from the tops of the protrusions into the recesses in the time that elapses until drying, and a clear coating film is formed that exhibits a natural graded texture. Preferably, the colored clear coating material is applied in a state where the surface temperature of the board before coating ranges from 10 to 40° C., since in that case there can be formed a texture having a more natural graded texture. In the case of an aqueous coating material, the board temperature before coating must be set somewhat higher, in order to form a film of the coating material in a stable manner. In this case, drying of the coating material starts before the latter has sunk into the recesses, and it becomes difficult to bring out a sufficiently graded texture, which is elicited through sinking of the coating material.

In the present invention, preferably, the aqueous coating film is formed through application of the aqueous coating over 4 to 15 g/square 'shaku' (about 0.3 meters), and the top clear coating film is formed through application of the UV-curable type clear coating material over 3 to 13 g/square 'shaku'. A smooth coated surface may fail to be formed in the building board, and the designability of the latter may be poor, among other concerns, if the amount of aqueous coating material is smaller than 4 g/square 'shaku', or the amount of UV-curable type clear coating material smaller than 3 g/square 'shaku'. On the other hand, the coating film may crack during drying and the workability thereof may become significantly impaired, if the amount of aqueous coating material is greater than 15 g/square 'shaku' or the amount of UV-curable type clear coating material is greater than 13 g/square 'shaku'.

In the present invention, preferably, the solvent-based clear coating film is formed by applying the solvent-based clear coating material over 4 to 10 g/square 'shaku'. A smooth coated surface may fail to be achieved if the amount of solvent-based clear coating material is smaller than 4 g/square 'shaku'. On the other hand, the coating film may crack during drying, the workability thereof may become significantly impaired, and sufficient non-flammability may fail to be achieved, if the amount of solvent-based clear coating material is greater than 10 g/square 'shaku'.

The present invention allows providing a building board having non-flammability and being excellent in designability.

DESCRIPTION OF THE PREFERRED EMBODIMENTS

Examples of the present invention are explained next.

The surface of a slag gypsum board, 6 mm thick and patterned with a pattern having a level difference of 1 mm, was coated, to 10 g/square 'shaku', with an impregnation sealer in the form of a aqueous coating material having a silica-based ceramic as a main component, followed by curing through drying for about 3 minutes in a dryer at about 110° C. Next, the surface was coated, to 10 g/square 'shaku', with an aqueous coating material having an acrylic emulsion as a main component and containing 35 wt % solids of decabromodiphenyl ether as a fireproofing agent, followed by curing through drying for about 1 minute in a dryer at about 100° C. The surface was then further coated, to 8 g/square 'shaku', with a solvent-based clear coating material having an acrylic resin as a main component and comprising no pigment, followed by curing through drying for about 1 minute in a dryer at about 100° C. The surface was further coated, to 8 g/square 'shaku', with a UV-curable type clear coating material having an acrylic resin as a main component, and containing 15 wt % solids of tricresyl phosphate as a fireproofing agent, followed by curing through UV irradiation, to yield a coated board of Example 1.

A coated board of Example 2 was obtained, through coating, in the same way as in Example 1, but herein the aqueous coating material having an acrylic emulsion as a main component and containing 35 wt % solids of decabromodiphenyl ether was changed to an aqueous coating material having an acrylic emulsion as a main component and containing 50 wt % solids of decabromodiphenyl ether, and the UV-curable type clear coating material having an acrylic resin as a main component and containing 15 wt % solids of tricresyl phosphate was changed to a UV-curable type clear coating material having an acrylic resin as a main component and containing 10 wt. % solids of tricresyl phosphate.

A coated board of Example 3 was obtained, through coating, in the same way as in Example 1, but herein the aqueous coating material having an acrylic emulsion as a main component and containing 35 wt % solids of decabromodiphenyl ether was changed to an aqueous coating material having an acrylic emulsion as a main component and containing 10 wt % solids of decabromodiphenyl ether, and the UV-curable type clear coating material having an acrylic resin as a main component and containing 15 wt % solids of tricresyl phosphate was changed to a UV-curable type clear coating material having an acrylic resin as a main component and containing 20 wt % solids of tricresyl phosphate.

A coated board of Example 4 was obtained, through coating, in the same way as in Example 1, but herein the aqueous coating material having an acrylic emulsion as a main component and containing 35 wt % solids of decabromodiphenyl ether was changed to an aqueous coating material having an acrylic emulsion as a main component and containing 50 wt % solids of decabromodiphenyl ether and antimony trioxide, and the UV-curable type clear coating material having an acrylic resin as a main component and containing 15 wt % solids of tricresyl phosphate was changed to a UV-curable type clear coating material having an acrylic resin as a main component and containing 10 wt % solids of cresyl phenyl phosphate.

A coated board of Example 5 was obtained, through coating, in the same way as in Example 1, but herein the solvent-based clear coating material having an acrylic resin as a main component and containing no pigment was changed to a light-black semi-transparent solvent-based clear coating material having an acrylic resin as a main component and containing 0.3 wt % solids of a pigment, and this solvent-based clear coating material was applied in a state where the surface temperature of the board was about 35° C.

A coated board of Example 6 was obtained, through coating, in the same way as in Example 1, but herein the aqueous coating material having an acrylic emulsion as a main component and containing 35 wt % solids of decabromodiphenyl ether was changed to an aqueous coating material having an acrylic emulsion as a main component and containing 50 wt % solids of decabromodiphenyl ether and antimony trioxide; the UV-curable type clear coating material having an acrylic resin as a main component and containing 15 wt % solids of tricresyl phosphate was changed to a UV-curable type clear coating material having an acrylic resin as a main component and containing 10 wt % solids of cresyl phenyl phosphate; the solvent-based clear coating material having an acrylic resin as a main component and containing no pigment was changed to a light-black semi-transparent solvent-based clear coating material having an acrylic resin as a main component and containing 0.3 wt % solids of a pigment, and this solvent-based clear coating material was applied in a state where the surface temperature of the board was about 35° C.

A coated board of Comparative example 1 was obtained, through coating, in the same way as in Example 1, but herein the aqueous coating material having an acrylic emulsion as a main component and containing 35 wt % solids of decabromodiphenyl ether was changed to an aqueous coating material having an acrylic emulsion as a main component and containing no fireproofing agent, and the UV-curable type clear coating material having an acrylic resin as a main component and containing 15 wt % solids of tricresyl phosphate was changed to a UV-curable type clear coating material having an acrylic resin as a main component and containing no fireproofing agent.

A coated board of Comparative example 2 was obtained, through coating, in the same way as in Example 1, but herein the aqueous coating material having an acrylic emulsion as a main component and containing 35 wt % solids of decabromodiphenyl ether was changed to an aqueous coating material having an acrylic emulsion as a main component and containing 3 wt % solids of decabromodiphenyl ether, and the UV-curable type clear coating material having an acrylic resin as a main component and containing 15 wt % solids of tricresyl phosphate was changed to a UV-curable type clear coating material having an acrylic resin as a main component and containing 3 wt % solids of tricresyl phosphate.

A coated board of Comparative example 3 was obtained, through coating, in the same way as in Example 1, but herein the aqueous coating material having an acrylic emulsion as a main component and containing 35 wt % solids of decabromodiphenyl ether was changed to an aqueous coating material having an acrylic emulsion as a main component and containing 55 wt % solids of decabromodiphenyl ether, and the UV-curable type clear coating material having an acrylic resin as a main component and containing 15 wt % solids of tricresyl phosphate was changed to a UV-curable type clear coating material having an acrylic resin as a main component and containing 25 wt % solids of tricresyl phosphate.

The state of the top clear coating films obtained in Examples 1 to 6 and Comparative examples 1 to 3 was observed, and the total calorific value was measured in accordance with ISO 5660, for 20 minutes using a cone calorimeter.

In the coated boards of Examples 1 to 6, the top clear coating film was formed to high hardness, no cracks were observed, and the finish was that of a mirror surface having depth. The coated boards exhibited also sufficient non-flammability, in that the total calorific value by cone calorimeter was smaller than 8 MJ/m$^2$. In Examples 5 and 6, moreover, a natural graded texture was formed by the colored clear coating films.

In the coated boards of Comparative examples 1 and 2, the top clear coating film was formed to high hardness, no cracks were observed, and the finish was that of a mirror surface having depth. However, the coated boards lacked non-flammability, in that the total calorific value by cone calorimeter was greater than 8 MJ/m$^2$. In the coated board of Comparative example 3, the top clear coating film was not formed to high hardness, and cracks were observed. Also, the coated board lacked non-flammability, in that the total calorific value by cone calorimeter was greater than 8 MJ/m$^2$.

Embodiments of the present invention have been explained above, but the invention is in no way limited to the above embodiments, and can accommodate various modifications without departing from the scope of the invention as defined in the appended claims.

As explained above, the present invention allows providing a building board having non-flammability and being excellent designability.

What is claimed is:

1. A building board in which an impregnated coating film, an aqueous coating film, a solvent-based clear coating film and a top clear coating film are formed, in this order, on a surface of a base member;
    wherein the aqueous coating film is formed of a synthetic resin and a fireproofing agent;
    the top clear coating film is formed of a UV-curable type resin and a fireproofing agent;
    an amount of the fireproofing agent in the aqueous coating film is 10 to 50 wt % with respect to solids of the aqueous coating film;
    an amount of the fireproofing agent in the top clear coating film is 5 to 20 wt % with respect to solids of the top clear coating film; and
    a total calorific value measured in accordance with ISO 5660, for 20 minutes using a cone calorimeter, is smaller than 8 MJ/m$^2$.

2. The building board according to claim 1,
    wherein a surface of said base member has an uneven pattern.

3. The building board according to claim 1 or claim 2,
    wherein said solvent-based clear coating film has a pigment.

* * * * *